United States Patent [19]

Hannes et al.

[11] Patent Number: 5,092,504
[45] Date of Patent: Mar. 3, 1992

[54] BICYCLE RACK FOR PICK-UP TRUCK

[75] Inventors: Kenneth J. Hannes, Madison; Mark A. Cowles, Cross Plains, both of Wis.

[73] Assignee: Graber Products, Inc., Green Bay, Wis.

[21] Appl. No.: 635,670

[22] Filed: Dec. 28, 1990

[51] Int. Cl.⁵ .............................................. B60R 9/00
[52] U.S. Cl. ...................... 224/42.45 R; 224/42.03 B;
224/42.42; 211/17; 410/3; 410/151
[58] Field of Search ...................... 224/42.45 R, 42.42,
224/42.03 B; 211/105.3, 105.4, 175, 17; 410/3,
127, 129, 145, 146, 147, 148, 149, 151

[56] References Cited

U.S. PATENT DOCUMENTS

| | | | |
|---|---|---|---|
| 2,293,168 | 8/1942 | Pirone | 211/105.4 |
| 2,637,555 | 5/1953 | Klaudt | 211/105.4 |
| 3,912,139 | 10/1975 | Bowman | 224/42.45 R |
| 4,834,599 | 5/1989 | Gordon et al. | 410/151 |

OTHER PUBLICATIONS

Yakima '89-'90, 1D Pick Up Truck Rack.

Primary Examiner—Linda J. Sholl
Attorney, Agent, or Firm—Fuller, Ryan & Hohenfeldt

[57] ABSTRACT

A bicycle rack is provided for the cargo compartment of a pickup truck. The rack includes an extendable longitudinal bar on which mounting brackets are provided for mounting of one or more a bicycles and detached front bicycle wheels. Means to extend the longitudinal bar such as a turnbuckle or rod having reverse threads on opposite ends thereof is provided so that the bar may be firmly clamped between the side walls of the pickup truck cargo compartment. A security system is provided in the form of a movable sleeve which envelopes a portion of said longitudinal bar and which can be locked in place over the turnbuckle or similar extending means. The sleeve is provided with a projecting tab which mates with a similar tab located on one end of the longitudinal bar. Aligned holes are provided in the two tabs for insertion of a padlock or the like.

5 Claims, 2 Drawing Sheets

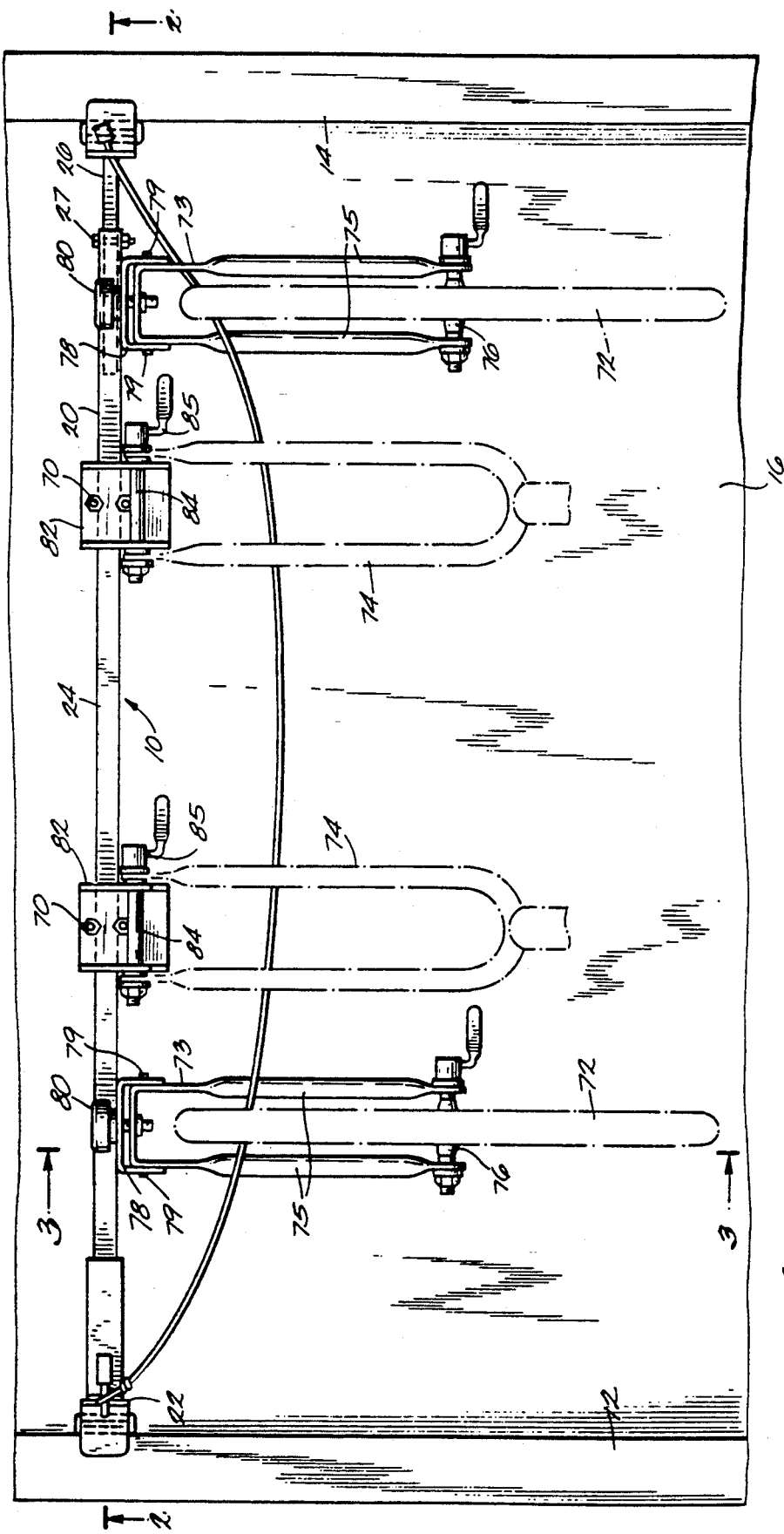
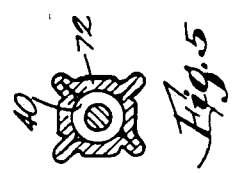

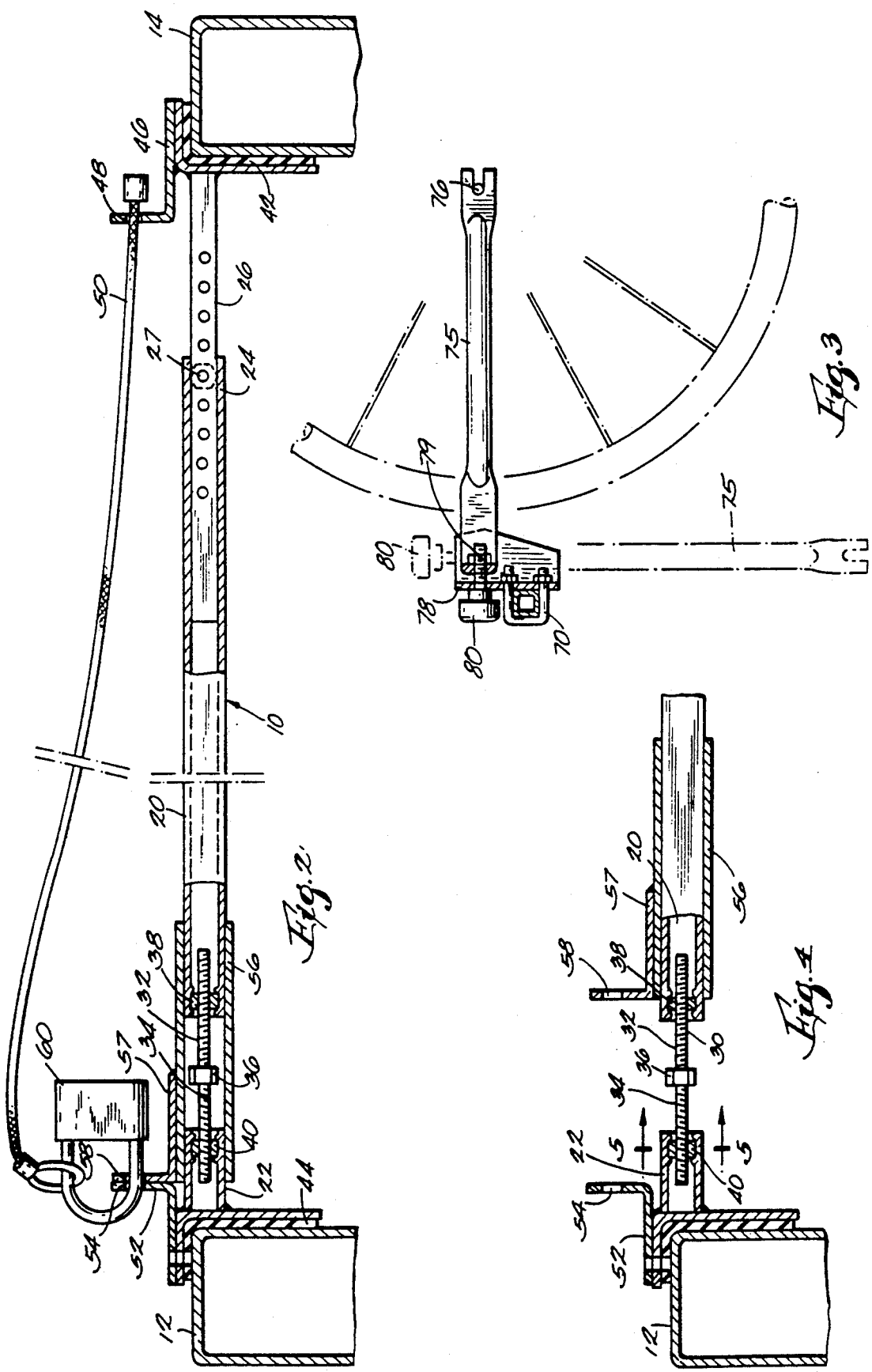

BICYCLE RACK FOR PICK-UP TRUCK

BACKGROUND OF THE INVENTION

This inventions relates to a bicycle rack for the cargo compartment of a pick-up truck, and more specifically to such a rack which can be clamped by outward pressure between the side walls of the cargo compartment.

Various designs have been provided for bicycle racks attachable to the rear or roof of a vehicle. In the case of pick-up trucks, racks or other means have been provided for mounting bicycles in the cargo compartment. Often such racks include a bar which is secured at opposite ends to the side walls of the pick-up truck cargo box. A persistent problem which has been encountered with such racks, however, is related to the fact that removal in many cases is simple and thus thefts of the bicycle and rack occur. A need has thus existed for a bicycle rack for pick-up trucks which are provided with an improved security system which would thwart the efforts of a bicycle thief.

SUMMARY OF THE INVENTION

The invention provides a bicycle rack which can be affixed to the cargo compartment area of a pick-up truck by extending the length of a longitudinal bar between the side walls of the cargo compartment so that the same can be clamped in place securely. The racks of the present invention are provided with security means in the form of a sleeve slidable on the bar which can be locked in position covering and preventing access to the means for extending More specifically, a bicycle rack is provided for the cargo compartment of a pickup truck, which includes an extendable longitudinal bar on which mounting brackets are provided for mounting of one or more a bicycles and detached front bicycle wheels. Means to extend the longitudinal bar such as a turnbuckle or rod having reverse threads on opposite ends thereof is provided so that the bar may be firmly clamped between the side walls of the pickup truck cargo compartment. A security system is provided in the form of a movable sleeve which envelopes a portion of said longitudinal bar and which can be locked in place over the turnbuckle or similar extending means. The sleeve is provided with a projecting tab which mates with a similar tab located on one end of the longitudinal bar. Aligned holes are provided in the two tabs for insertion of a padlock or the like. In its preferred embodiment, the rack of this invention includes a longitudinal bar which is adjustable in length at each end. One of the adjustments is for the purpose of fixing the length to approximately fit the cargo box of a specific pick-up truck in which the rack is to be installed, while the second adjustment is for the purpose of extending the bar after placement between the cargo box walls to firmly clamp the bar in place by outward pressure against the walls. the ends of the longitudinal bar except when the lock is removed.

DESCRIPTION OF THE DRAWINGS

Numerous further aspects and advantages of the invention will become apparent from the following detailed description and drawings wherein:

FIG. 1 is a fragmentary top view of a pick-up truck cargo box with a bike rack of this invention mounted therein also showing bicycles and bicycle front wheels mounted thereon;

FIG. 2 is a cross-sectional view taken along line 2—2 of FIG. 1;

FIG. 3 is a cross-sectional view taken along line 3—3 of FIG. 1;

FIG. 4 is a fragmentary cross-sectional view showing the mounting bar extending means with the security guard means in the open position; and FIG. 5 is a cross-sectional view taken along 5—5 of FIG. 4.

DESCRIPTION OF A PREFERRED EMBODIMENT

Referring to the drawings there is seen a longitudinal mounting bar 10 which is clamped by outward pressure between the side walls 12 and 14 of a pick-up truck cargo box 16. Longitudinal member 10 is formed from two aligned extendable segments 20 and 22. Preferably the longer segment or component 20 of longitudinal bar 10, which may be formed of hollow steel square cross-sectional tubing is formed of two parts 24 and 26 secured together by means of a bolt 27 or similar fastening device. End 26 may also be formed of tubular steel which is of a cross-section and dimensions such that it will slide within part 24.

Segments 20 and 22 are adjustably secured together by means 30 which in the illustrated embodiment consists of a shaft having right hand threads on one end 32 and left hand threads on the opposite end 34. Means for rotating the shaft are provided at the center thereof, for example, nut 36. The ends of shaft 30 are tapped into female appropriately right and left threaded means at the end of shafts 20 and 22 such as embedded nuts 38 and 40, respectively. Integral with the ends of segments 20 and 22 are L-shaped brackets 42 and 44 adapted to engage the inside top edge of pick-up truck side walls 12 and 14.

A bracket 46 is welded to and integral with end 26 of segment 20 and is provided with an opening 48 to receive one end of a metal cable 50. A bracket 52 having a vertical end as shown with an opening 54 is integral with end 22 of longitudinal bar 10.

A security means is provided in the form of a hollow tube 56 which envelopes a portion of bar segment 20 as seen in FIG. 4. Tube 56 is of a sufficient length to enclose extending means 30 and make it inaccessible as shown in FIG. 2 when secured by a lock 60. Integral with the top of tube 56 is a bracket 57 having a vertical end aligned with tab 52. A hole 58 aligned with hole 54 is provided so that the two parts can be fastened together by lock 60. It will be apparent that cable 50 can be threaded through each part of the bicycles mounted on rack 10 and thereafter secured at the other end by means of lock 60.

Rack 10 is therefore installed between the side walls 12 and 14 of a pick-up truck by securing parts 24 and 26 together by bolt 27 at an appropriate location so that the length of rack 10 will approximate the distance between the side walls 12 and 14. After the rack is loosely in position between side walls 12 and 14, nut 36 is rotated by means of an appropriate wrench to extend ends 20 and 22 away from each other until a firm amount of clamping pressure is exerted against the inside of walls 12 and 14. When under a sufficient amount of pressure bolt, 27 cannot be readily removed without damaging or destroying rack 10. Attached to rack 10, for example, by means of U bolts 70 are brackets for attachment of a bicycle front wheel 72 and front wheel forks 74. The preferred configuration for a wheel bracket 73 is a pair of longitudinal arms 75 spaced apart suitably to receive the hubs 76 of wheel 72.

As seen in FIG. 3, arm 75 can be folded downward when the rack 10 is not in use in order to avoid interfering with the use of cargo compartment 16 for other purposes. This may be accomplished by forming arm 75 as opposite ends of a U-shaped piece as best seen in FIG. 1. The base of the U-shaped piece is pivotally attached to a bracket by means of bolts or pins 79. When rack 10 is in use, arms 75 are clamped in a horizontally extended orientation as seen in FIGS. 1 and 3 by means of a hand operable clamping bolt 80 which can be loosened to pivot the arms downwardly as shown by dotted lines in FIG. 3. Another pair of brackets 82 is attached to rack 10 by U-bolts 70 for the purpose of mounting thereon the front fork 74 of a bicycle from which the front wheel is removed. Conventional shaft 84 of an appropriate length to receive the ends of fork 74 is provided through suitable openings in bracket 82. The brackets 82 are provided with upwardly extending side walls through which shaft 84 passes. Shaft 84 can be locked in position by a suitable locking means 85 which is locked by overcenter travel.

Adjustable clamping means 30 may, for example, be in the form of a pair of threaded rod ends 32 and 34 each of which are welded to an end of a components 22 and 20, respectively. Such threaded rod ends can be adjustably moved away from each other by means of a conventional turnbuckle (not shown). Other mechanical means for adjustably extending the ends of the rack 10 will also be apparent to those skilled in the art and it is contemplated that such means can be substituted, as desired, for the specific structure shown in the drawings.

The specific physical embodiments herein disclosed are intended to exemplify the invention which may be embodied in other specific structures. The scope of the invention is defined in the claims appended hereto.

What is claimed is:

1. A rack for securing bicycles in the cargo compartment of a pickup truck comprising an elongated cross-member of adjustable length adapted to engage and clamp, by outward pressure, between the interior surfaces of a pickup truck cargo box, said cross-member being formed of at least two members which are longitudinally extendable relative to each other, locking means between the extendable members to adjustably secure said members at a desired length, one of said longitudinally extendable members having a first tab extending outwardly therefrom and having an opening therein, a movable sleeve enveloping a portion of said longitudinally extendable cross-member and being of sufficient length to enclose a space between said two extendable members, a second tab extending from said sleeve, said tab being in alignment with the first tab and having an opening which aligns with the opening in said first tab, to permit locking of said sleeve over said space, at least one pair of aligned projecting arms extending perpendicularly from said cross-member and adapted to secure a bicycle wheel thereto, and at least one bracket on said cross-member which carries means to receive and lock onto the front fork of a bicycle from which the wheel has been removed.

2. A rack according to claim 1 wherein said locking means comprises a shaft having a but centrally secured integrally thereto and having right-hand threads on one end thereof and left-hand threads on the other end thereof.

3. A rack according to claim 1 wherein a cable is provided for locking one or more bicycles to said rack.

4. A rack according to claim 1 wherein said projecting arms are pivotally attached to a bracket secured to said cross-member, and means are provided to secure said arms in extended position, said means being releasable to permit said arms to be pivoted downwardly when not in use.

5. A rack for securing bicycles in the cargo compartment of a pickup truck comprising an elongated cross-member of adjustable length adapted to engage and clamp, by outward pressure, between the interior surfaces of a pickup truck cargo box, said cross-member being formed of three hollow tubular segments which are longitudinally extendable relative to each other, two of said segments being telescoped together and being provided with means to adjustably secure them together at a desired length, means between the end of one of said two segments and an end of the third segment to adjustably secure said segments at a variably extendable length, said third segment having a first tab extending outwardly therefrom which has an opening therethrough, a movable sleeve enveloping a portion of said longitudinally extendable cross-member and being of sufficient length to enclose the means to adjustably secure said segments, a second tab integral with and extending from said sleeve, said second tab being in alignment with the first tab and having an opening which aligns with the opening in said first tab, to permit locking of said tabs together, at least one pair of aligned projecting arms extending perpendicularly from said cross-member and adapted to secure a bicycle wheel thereto, and at least one bracket on said cross-member which carries means to receive and lock onto the front fork of a bicycle from which the wheel has been removed.

* * * * *

UNITED STATES PATENT AND TRADEMARK OFFICE
CERTIFICATE OF CORRECTION

PATENT NO. : 5,092,504
DATED : March 3, 1992
INVENTOR(S) : Kenneth J. Hannes and Mark A. Cowles It is certified that error appears in the above—identified patent and that said Letters Patent is hereby corrected as shown below:

Column 4, line 12:
  Delete "but" and substitute --- nut ---.

Signed and Sealed this

Fifteenth Day of June, 1993

Attest:

MICHAEL K. KIRK

Attesting Officer        Acting Commissioner of Patents and Trademarks